United States Patent [19]
Schmidt

[11] 3,972,205
[45] Aug. 3, 1976

[54] AXIAL THRUST RESISTING IN-LINE COUPLING

[76] Inventor: Richard Schmidt, 11525 Islandale Drive, Cincinnati, Ohio 45240

[22] Filed: Oct. 3, 1974

[21] Appl. No.: 511,696

[52] U.S. Cl. .................................. 64/19; 64/12; 403/44
[51] Int. Cl.² ........................................ F16D 3/54
[58] Field of Search .............. 64/19, 31, 12; 403/44

[56] References Cited
UNITED STATES PATENTS

| | | | |
|---|---|---|---|
| 2,551,837 | 5/1951 | Holloway | 64/19 |
| 2,903,283 | 9/1959 | Sweetland | 403/44 |
| 3,132,479 | 5/1964 | Kuhn, Jr. | 64/19 |
| 3,242,694 | 3/1966 | Schmidt | 64/19 |
| 3,664,153 | 5/1972 | Sugahara | 64/19 |
| 3,791,170 | 2/1974 | Schmidt | 64/19 |
| 3,858,411 | 1/1975 | Hiersig et al. | 64/19 |

Primary Examiner—Benjamin W. Wyche
Assistant Examiner—Randall Heald
Attorney, Agent, or Firm—Cushman, Darby & Cushman

[57] ABSTRACT

An in-line coupling(s) which resists axial compression thrusts and axial tension loading or axial misalignment. Two outer rotary members are connected to a central rotary member by at least one pair of parallel links each, the links being rotatable about shafts mounted on the respective rotary members. The central rotary member has an opening extending therethrough adapted to receive an axially incompressible assembly passing therethrough. The assembly may include end portions pivotally mounted about shafts secured to the outer rotary members, and the length of the assembly may be adjusted for adapting the assembly to differently dimensioned rotary members and couplings. The assembly may alternatively include means for resisting axial misalignment of the rotary members.

10 Claims, 8 Drawing Figures

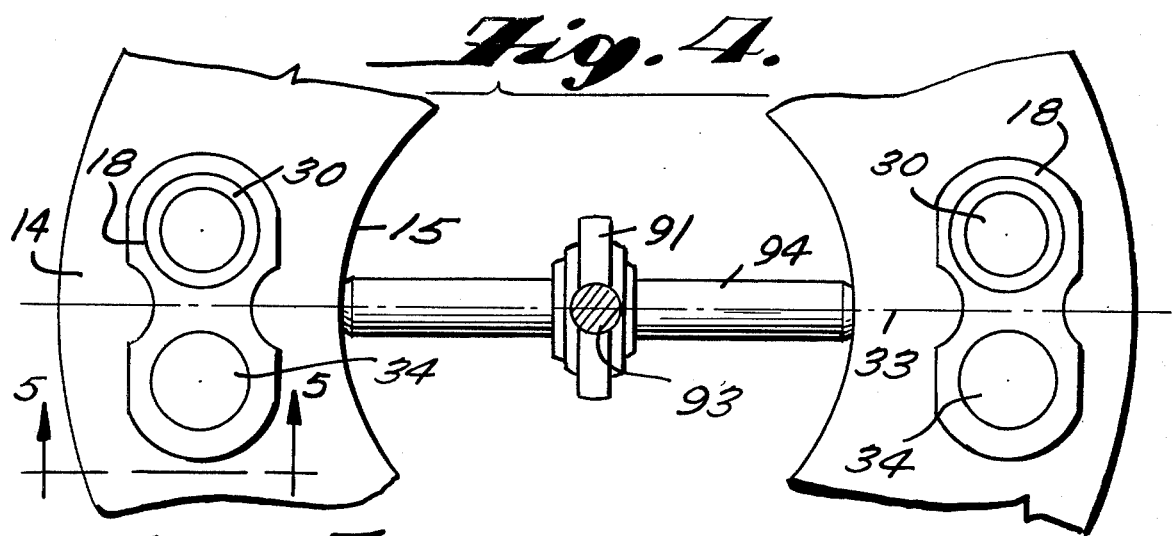
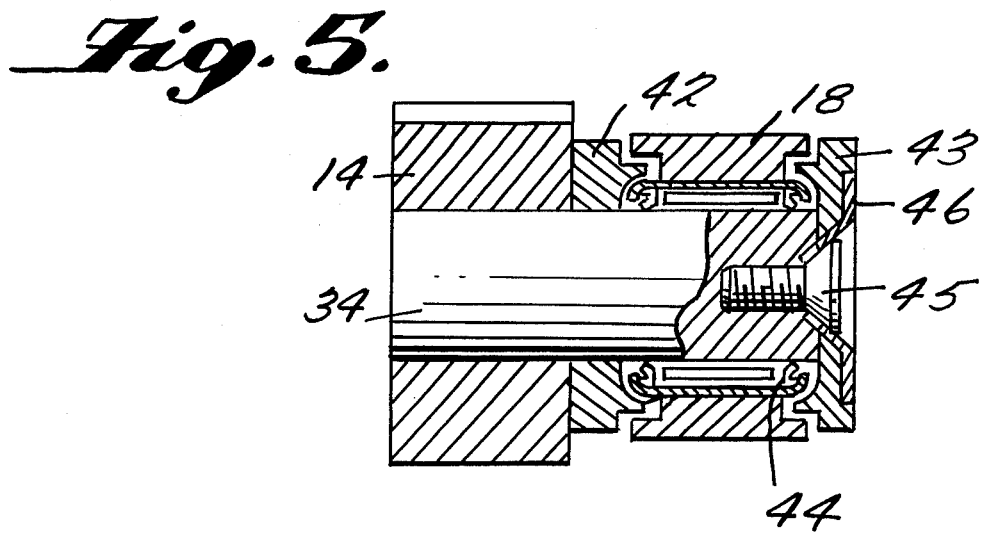
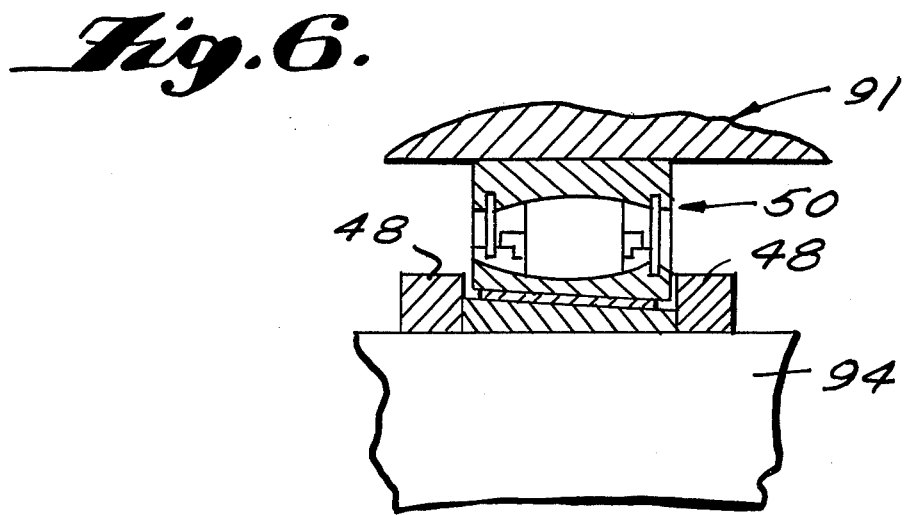

3,972,205

AXIAL THRUST RESISTING IN-LINE COUPLING

BACKGROUND AND SUMMARY OF THE INVENTION

The invention relates to couplings and more particularly to couplings for drivingly interconnecting a pair of shafts or the like in axial alignment and axial misalignment operable to transmit therebetween high rotational speeds and torques, and capable of taking axial compression thrust, and axial tension loads or misaligning loads.

The type of coupling herein contemplated is particularly for use in rotary motion transmission where axial misalignment of an extent greater than that normally accommodated by conventional flexible couplings, and/or for lesser misalignments requiring greater speed and torque transmissions than can be practically provided by such flexible couplings, and where axial compression thrust and axial tension loads must be resisted for whatever reason — as to prevent damage to or insure proper operation of means connected to the pair of shafts or the like connected by this type of coupling. The type of coupling herein contemplated is also for use in rotary motion transmission where axial compression thrust and axial misalignment must be resisted for whatever reason — as to prevent damage to or insure proper operation of means connected to the pair of shafts or the like connected by this type of coupling.

The coupling of the present invention is useful in place of the coupling shown in U.S. Pat. No. 3,791,170 (which patent disclosure is incorporated herein by reference), or an "Alsthom coupling" (such as shown in an article entitled "Laterally Movable Couplings — Structural and Kinematic Systematization" by Diditza [Antriebstechnik 10, 1971, Nr. 11, page 409], FIGS. 36 – 39 thereof) in situations where axial compression thrust and axial misalignment must be resisted, for whatever reasons. The coupling of the present invention retains all the advantages of the above-mentioned coupling while additionally providing the above-mentioned resistances.

Thus, the primary object of the present invention is to provide a coupling retaining all the advantages of the previously mentioned prior-art couplings while additionally resisting axial compression thrust and axial tension loads, or axial compression thrust and axial misalignment. This and other objects of the invention will become clear from an inspection of the detailed description of the invention and from the appended claims.

BRIEF DESCRIPTION OF THE DRAWINGS

FIG. 4 is a sectional view taken along lines 4 — 4 of FIG. 1;

FIG. 5 is an enlarged fragmentary sectional view taken along lines 5 — 5 of FIG. 4 showing one form of bearing assembly utilized in the coupling of the present invention;

FIG. 6 is an enlarged fragmentary sectional view taken along lines 6 — 6 of FIG. 1 showing another bearing utilizable in the coupling of the present invention.

Figure 1:
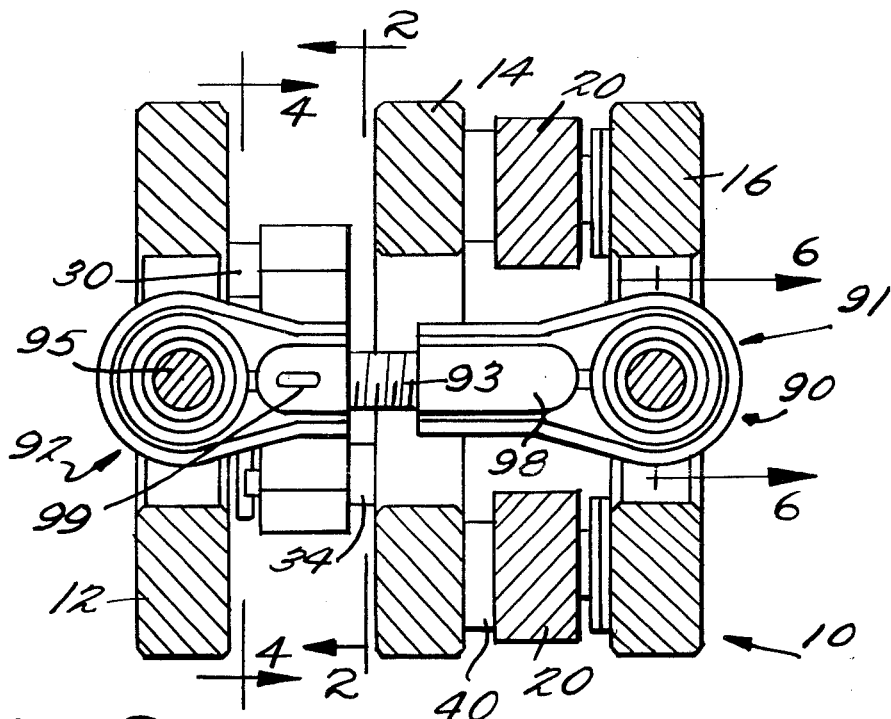
FIG. 1 is a cross-sectional view of an exemplary coupling according to the teachings of the present invention showing parts thereof in elevation.
Figure 2:
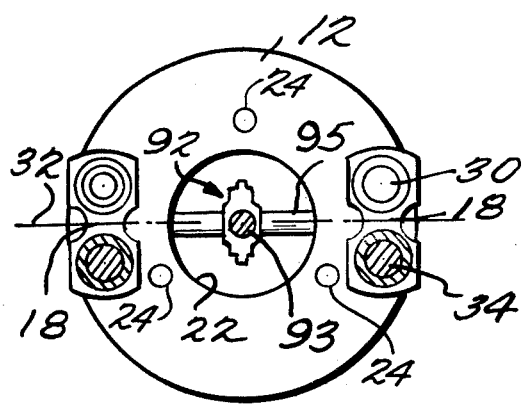
FIG. 2 is a sectional view taken along lines 2 — 2 of FIG. 1.
Figure 3:
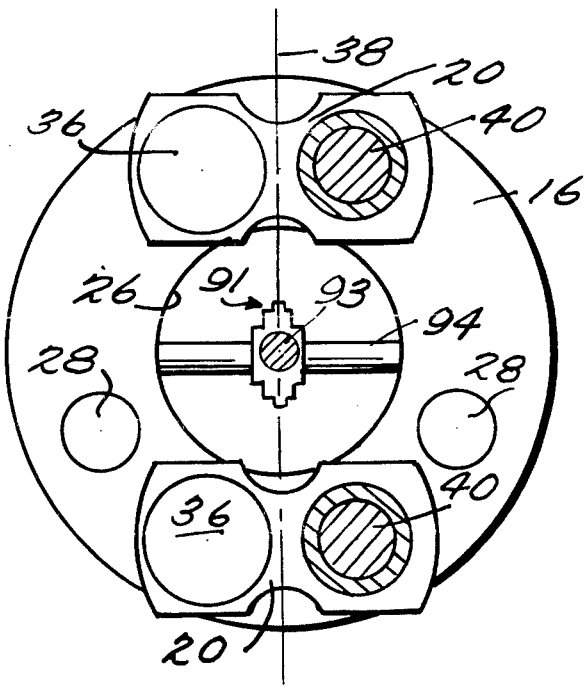
FIG. 3 is a sectional view taken along lines 3 — 3 of FIG. 1.

Referring now more particularly to the drawings, there is shown in FIGS. 1 – 3 thereof, a coupling, generally indicated at 10, embodying the principles of the present invention. In general, the coupling 10 includes three rotary members 12, 14 and 16 arranged so that the member 14 constitutes a central rotary member disposed between first and second outer rotary members 12 and 16 respectively. The coupling also includes a first pair of parallel links 18 pivotally interconnected between the first outer rotary member 12 and the central rotary member 14 and a second pair of links 20 pivotally connected between the central rotary member 14 and the second outer rotary member 16.

The rotary members 12, 14 and 16 are preferably of generally flat disk-like configuration normally disposed with their flat sides generally parallel. The shape of each rotary member is symmetrical about an axis of symmetry and, as shown, is generally of circular peripheral configuration. It will be understood that each of the outer disk-like members is provided with suitable means for detachably fixedly connecting the same to a shaft or the like. As shown in FIG. 2, the rotary member 12 is formed with a central opening 22 and has a plurality of annularly spaced threaded openings 24 extending axially therethrough. The threaded openings 24 are adapted to receive bolts which serve to secure a radial flange of a flanged collar (not shown) to the exterior surface of the rotary member 12. As shown in FIG. 3, a similar central opening 26 and threaded openings 28 are formed in the outer disk-like member 16 for similar purposes. It will be understood that other arrangements for effecting the connection to the shafts may be provided, such as forming integral collar portions on the outer disk members or the like. The central disk-like member 14 is also provided with a central opening 15 (see FIG. 4) therein to allow passage of a means for resisting axial thrust therethrough, as will be more fully explained hereinafter.

Referring now more particularly to FIG. 2, it will be noted that one of the ends of each link 18 is pivotally connected with the outer disk-like member 12 by a pair of shafts 30 fixedly secured to the member 12 and extending from the inward face thereof toward the central member 14. In the embodiment shown, the shafts 30 are fixed within appropriate openings formed through the disk-like member 12 as by a press fit or the like. In this regard it will be noted that with this arrangement the portions of the shafts filling the openings become, in essence, a part of the rotary member so that the openings provided for the shafts need not be considered in the symmetrical relationship of the rotary members as shown in the drawings. The shafts 30 are positioned on the rotary member 12 so that their axes are disposed in equally spaced parallel relation with the symmetrical axis of the member 12. In addition, the axes are disposed in equally spaced relation on one side of a plane, indicated at 32 in FIG. 2, passing through the symmetrical axis of the member 12. It is to be understood, however, that the shafts 30 may be disposed so that they are in equally spaced relation on opposite sides of plane 32 passing through the symmetrical axis of the member 12.

The opposite ends of each link 18 are connected to the central member 14 by a pair of shafts 34 suitably fixed to the central member 14 so as to extend from the face thereof adjacent the member 12 in a direction toward the latter. The shafts 34 are positioned with respect to the central rotary member 14 so that the axes thereof are disposed in equally spaced parallel relation with the symmetrical axis of the central member 14 and in equally spaced relation on the opposite sides of a plane 33 passing through the symmetrical axis thereof (see FIG. 4). It is to be understood, however, that the shafts 34 may be disposed so that they are in equally spaced relation on opposite sides of plane 33 — spaced opposite lines 32, 33 to the shafts 30 secured to member 12.

Referring now more particularly to FIG. 3, one of the ends of the links 20 is connected to the outer disk-like member 16 by a pair of shafts 36 suitably fixed to the rotary member 16 and extending outwardly from the inward face thereof toward the central rotary member 14. As shown in FIG. 3, the shafts 36 are positioned with respect to the member 16 so that the axes thereof are disposed in equally spaced parallel relation with the symmetrical axis of the member 16 and in equally spaced relation on one side of a plane, indicated at 38 in FIG. 3, passing through the symmetrical axis of the member 16. Again, it is to be understood that the shafts 36 may be disposed so that they are in equally spaced relation on opposite sides of plane 38.

The opposite ends of the links 20 are connected with the central rotary member 14 by a pair of shafts 40 which are suitably fixed to the central member 40 and extend outwardly of the face thereof adjacent the member 16 in a direction toward the latter. These shafts are positioned with respect to the central member so that their axes are disposed in equally spaced parallel relation with the symmetrical axis of the central member 14 and in equally spaced relation on the opposite side of a plane similar to the plane 38 passing through the symmetrical axis of the central member 14. Again, it is to be understood that the shafts 40 may be disposed so that they are in equally spaced relation on opposite sides of a plane similar to plane 38 passing through the symmetrical axis of the central member 14 — spaced opposite line 38 to the shafts 36 secured to member 16.

As is made clear in the above-mentioned U.S. Pat. No. 3,791,170, when the coupling illustrated in the drawings is connected between a pair of shafts in axial alignment with one another the axis of symmetry of each of the disk-like members 12, 14 and 16 will be disposed coincident with the axes of the shafts so that the planes 32 and 38 will pass through the axes of symmetry of all of the rotary members and be disposed in perpendicular relation with respect to one another. Also, when the coupling is in this aligned position, as shown in FIGS. 1 – 3, the links 18 extend from the shafts 30 or 34 in the same direction beyond the first plane 32 in symmetrical relation thereto. Likewise, the links 20 extend from the shafts 36 or 40 in the same direction beyond the plane 38 in symmetrical relation thereto. It will also be noted that when the coupling is in the aligned position, all of the links are disposed in symmetrical relation about the aligned axis of symmetry. The length of the links can be any desired dimension so long as the above-mentioned relationships are maintained, except that the length of the links relative to the diameter of the opening 15 in middle disk 14 may not be so great that the disk 14 will strike the means for resisting axial thrust (90, as will be more fully explained hereinafter) that passes through the member 14.

Referring now to FIG. 5, there is shown therein a preferred arrangement for effecting the pivotal connection between each of the links 18 and 20 and the shafts associated therewith. A typical connection is shown between the shaft 34 and link 18 in which a spacer collar 42 is mounted in surrounding relation to the shaft 34 between the member 14 and link 18. The surface of the collar 42 opposite the member 14 is adapted to engage the inner edge of a conventional needle bearing assembly shown generally at 44, mounted within an appropriate opening in the link 18 in surrounding relation to the shaft 34. The needle bearing assembly 44 is preferably of the sealed type, and may be of any conventional construction. The outer edge of the bearing assembly 44 is engaged by a thrust washer 43 which is preferably retain on the outer edge of the shaft 34 by a screw 45 passed through a Tinnerman washer and threaded into the shaft 34. Other conventional means — such as a C-clip — could also be used to secure the link and bearing assembly to the shaft.

Needle bearing assemblies are preferred under many circumstances becuase of their lubricating qualities and the fact that most standard needle bearings provide a slight degree of angular novement. This capability of angular movement is also provided with conventional spherical bearings, and obviously they could be used in place of the needle bearings for certain applications.

An exemplary means for resisting axial thrust associated with the coupling 10 of the present invention is shown generally at 90 in FIG. 1. This means comprises a pair of coupling portions, shown generally at 91 and 92, connected to each other by a turnbuckle rod 93 or the like, oppositely threaded end portions of the member 93 being screw-threadedly engaged by the interior threaded portions 98, and 99 of coupling portions 91, 92 respectively. It is apparent that the length of the assembly 90 can be adjusted by screw-adjustment between members 91 and 92, and member 93. Each of the coupling portions 91, 92 is pivotal about a shaft — shafts 94 and 95 respectively — secured within the openings 26, 22 respectively of the discs 16, 12 respectively. Details of an exemplary spherical bearing utilizable as a bearing for coupling portions 91 or 92 to provide pivotal movement thereof about shafts 94, 95 respectively, are shown in FIG. 6. Any suitable collar members 48 retain a conventional spherical bearing assembly 50 (an exemplary embodiment being the assembly manufactured by McGill under the trademark SPHERE-ROL) to provide for pivotal movement between the shaft 94 and the coupling portion 91.

Figure 7:
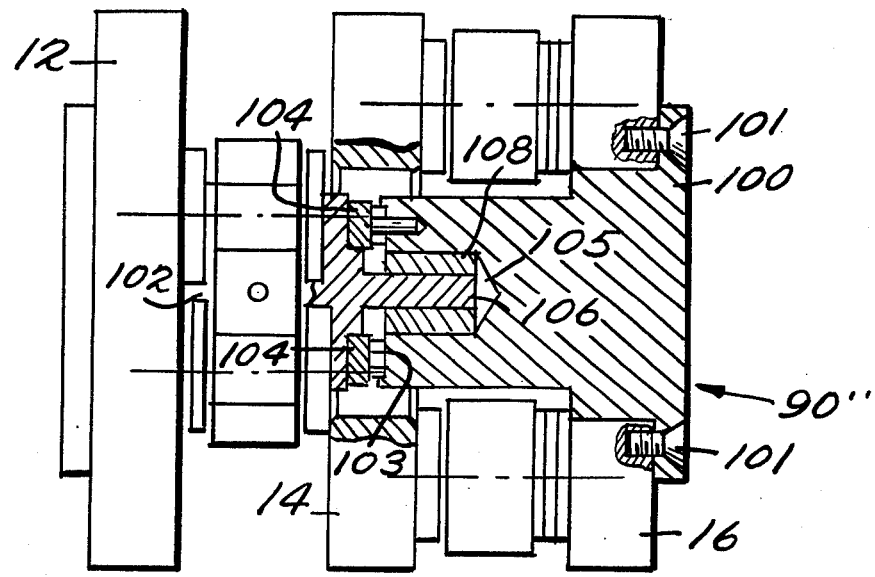
FIG. 7 is a side elevational view partly in section of another embodiment of a coupling according to the teachings of the present invention.
Figure 8:
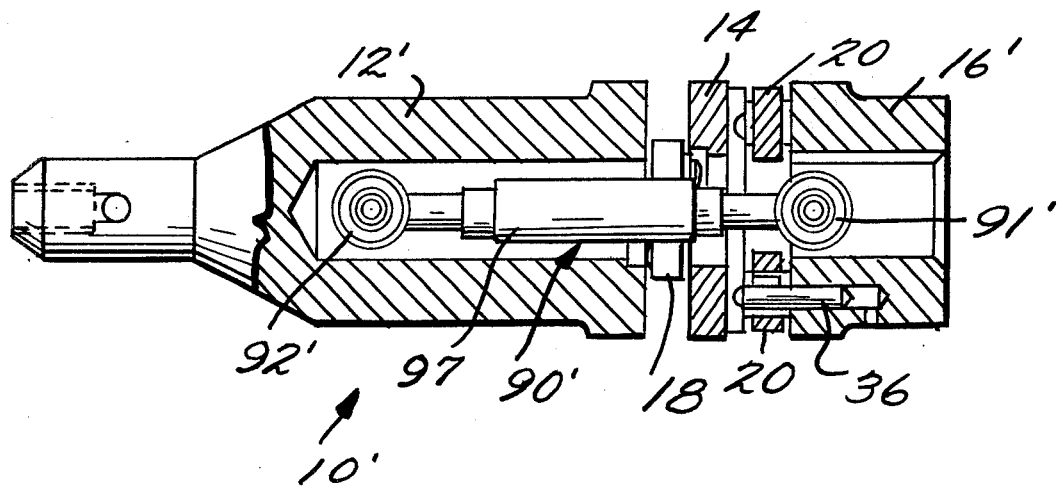
FIG. 8 is a sectional view partly in elevation of a third embodiment of a coupling according to the teachings of the present invention.

As is apparent from an inspection of FIGS. 1 and 6 especially, as rotational movement of member 16 is transferred exactly to member 12, there is no need to provide for relative rotational movement between the members 91 and 92 attached to members 16 and 12 respectively. No axial movement — whether axial compression thrusts or axial tension loads are applied — will be permitted by the means 90 thus making such a coupling 10 suitable for use in situations wherein relative axial movement between the members 16 and 12 is undesirable, for whatever reason. The provision of spherical bearing connections (50) between members 91, 94 and 92, 95 respectively, allows axial misalignment of the discs 12, 16 to take place, however (as shown in FIGS. 6 – 8 of the above mentioned U.S. Pat. No. 3,791,170).

A modification of a coupling 10 according to the teachings of the present invention is shown in FIG. 7. All elements of this embodiment are the same except that the axial thrust resisting means 90'' is adapted for different situations than the embodiment shown in FIG. 1. The means 90'' comprises a pair of coupling portions 100, 102 each rigidly connected to the members 16, 12 respectively by suitable means, such as screws 101 extending through openings in members 100, 102 into discs 16 and 12 respectively. The portion 100 contains a washer 103 in a recess formed therein, which washer is detachably connected to portion 100 by pins 104 which are engaged by recesses formed in portion 102. A projection 106 extending from portion 102 extends into opening 105 formed in portion 100. A packing collar 108 of resilient material is provided between projection 106 and the walls of portion 100 defining opening 105. It will thus be seen that the means 90'' is addition to resisting axial thrust by abutting engagement between members 102 and 104 also resists any angular movement and thus misalignment between discs 16 and 12 by the engagement of members 106 and 108, and thus provides a self-centering function. This particular embodiment does not resist axial tension loading, however, although a measure of axial tension loading resistance may be provided by providing a lost-motion linear coupling between members 106 and 108 if member 108 is secured to the interior of bore 105.

A third embodiment of a coupling according to the present invention is shown in FIG. 8. In this coupling 10', the members 12', 16' are formed as discs connected directly to and integral with the shafts, thus providing a larger opening for securement of axial thrust resisting means members 12' and 16'. The axial thrust resisting means 90' includes coupling portions 91', 92' both of which are rigidly connected to a push rod 97, no adjustment between the portions 91' and 92' being possible in this embodiment, as is possible when the member 93 and threaded members 98, 99 are utilized (FIG. 1).

Increased torque transmission capability can be built into a coupling according to the teachings of the present invention by the simple expedient of providing more than two links between adjacent rotary members, such as shown in FIGS. 9, 10 and 11 of U.S. Pat. No. 3,791,170, which has been incorporated by reference in the present disclosure.

It will thus be seen that according to the teachings of the present invention a coupling is provided whereby axial compression thrust and axial tension loading or axial misalignment will be resisted without interfering in any way whatsoever with the transfer of rotary movement from one shaft to another, even under conditions of high angular velocity and torque.

While the invention has been herein illustrated and described in what is presently conceived to be the most practical and preferred embodiments, it will be obvious to one of ordinary skill in the art that many modifications may be made thereof within the scope of the invention, and it is intended that the appended claims be accorded their full scope so as to encompass all equivalent structure and devices.

What is claimed is:

1. A coupling for drivingly interconnecting a pair of shafts or the like in axial alignment operable to transmit therebetween high rotational speeds and torques while resisting axial compression thrusts, said coupling comprising
    a. three rotary members mounted in an arrangement in which a central rotary member is disposed between first and second outer rotary members, each of said rotary members having a shape symmetrical about an axis of symmetry which is aligned with the axis of the shafts to be connected when in said axially aligned relation,
    b. a first pair of shafts fixed to said first rotary member and extending outwardly thereof toward said central rotary member, the axes of said first pair of shafts being disposed in equally spaced parallel relation with the symmetrical axis of said first rotary member and being equally spaced from a first plane passing through the symmetrical axis of said first rotary member,
    c. a first pair of parallel links disposed between said first rotary member and said central rotary member pivotally mounted on said first pair of shafts and extending therefrom beyond said first plane,
    d. a second pair of shafts fixedly mounted on said central rotary member and pivotally interconnected with said first pair of links,
    e. a third pair of shafts fixed to said second rotary member and extending outwardly therefrom toward said central rotary member, the axes of said third pair of shafts being equally spaced from a second plane passing through the symmetrical axis of said second rotary member in generally perpendicular relation to said first plane,
    f. a second pair of parallel links disposed between said second outer rotary member and said central rotary member pivotally mounted on said third pair of shafts and extending therefrom beyond said second plane
    g. a fourth pair of shafts fixedly mounted on said central rotary member and pivotally interconnected with said second pair of links,
    h. means defining an opening extending through the center of said central rotary member, and
    i. means for resisting axial compression thrust acting on said coupling, said means including a relatively axially incompressible assembly operatively connected to each of said shafts and passing through said opening extending through the center of said central rotary member, said opening being so dimensioned with respect to the lengths of said links that striking of said assembly passing through said opening by said central rotary member will not occur during rotational transmitting operation of said coupling, said axially incompressible assembly also including means for resisting all axial misalignment force vectors acting on said coupling.

2. A coupling as recited in claim 1 wherein said relatively axially incompressible assembly passing through said opening in said central rotary member also includes means for resisting axial tension loads acting on said coupling.

3. A coupling as recited in claim 2 wherein said assembly passing through the opening in said central rotary member includes a first mounting shaft rigidly mounted to means defining an opening through the center of said first outer rotary member, a second mounting shaft rigidly mounted to means defining an opening through the center of said second outer rotary member, and a coupling portion operatively connected to each of said shafts.

4. A coupling as recited in claim 3 wherein each of said coupling portions includes means for mounting said portions for pivotal movement about one of said mounting shafts in a plane perpendicular to the axes of said first and second mounting shafts.

5. A coupling as recited in claim 4 wherein said pivotally mounting means include spherical bearing assemblies.

6. A coupling as recited in claim 3 further comprising means connected to each of said coupling portions for allowing adjustment of the length of said relatively axially incompressibly assembly.

7. A coupling as recited in claim 1 wherein said assembly includes a coupling portion rigidly secured to said first outer rotary member, a coupling portion rigidly secured to said second outer rotary member, a projection extending from one of said coupling portions into a recess formed in said other coupling portion, and resilient means operatively engaging the walls defining said recess and said projection to bias said coupling portions and rotary members operatively connected thereto to the axially aligned position.

8. A coupling for drivingly interconnecting a pair of shafts or the like in axial alignment operable to transmit therebetween high rotational speeds and torques while resisting axial compression thrusts, said coupling comprising
 a. three rotary members mounted in an arrangement in which a central rotary member is disposed between first and second outer rotary members, each of said rotary members having a shape symmetrical about an axis of symmetry which is aligned with the axis of the shafts to be connected when in said axially aligned relation,
 b. a first pair of shafts fixed to said first rotary member and extending outwardly thereof toward said central rotary member, the axes of said first pair of shafts being disposed in equally spaced parallel relation with the symmetrical axis of said first rotary member and being equally spaced from a first plane passing through the symmetrical axis of said first rotary member,
 c. a first pair of parallel links disposed between said first rotary member and said central rotary member pivotally mounted on said first pair of shafts and extending therefrom beyond said first plane.
 d. a second pair of shafts fixedly mounted on said central rotary member and pivotally interconnected with said first pair of links,
 e. a third pair of shafts fixed to said second rotary member and extending outwardly therefrom toward said central rotary member, the axes of said third pair of shafts being equally spaced from a second plane passing through the symmetrical axis of said second rotary member in generally perpendicular relation to said first plane, the axes of said first pair of shafts being in equally spaced relation on one side of said first plane, and the axes of said third pair of shafts being in equally spaced relation on one side of said second plane,
 f. a second pair of parallel links disposed between said second outer rotary member and said central rotary member pivotally mounted on said third pair of shafts and extending therefrom beyond said second plane,
 g. a fourth pair of shafts fixedly mounted on said central rotary member and pivotally interconnected with said second pair of links,
 h. means defining an opening extending through the center of said central rotary member, and
 i. means for resisting axial compression thrust acting on said coupling, said means including a relatively axially incompressible assembly operatively connected to each of said shafts and passing through said opening extending through the center of said central rotary member, said opening being so dimensioned with respect to the lengths of said links that striking of said assembly passing through said opening by said central rotary member will not occur during rotational transmitting operation of said coupling.

9. A coupling as recited in claim 8 wherein said relatively axially incompressible assembly passing through said opening in said central rotary member also includes means for resisting axial tension loads acting on said coupling.

10. A coupling as recited in claim 8 wherein said relatively axially incompressible assembly passing through said opening in said central rotary member also includes means for resisting axial misalignment forces action on said coupling.

* * * * *